United States Patent
Lee et al.

(10) Patent No.: US 7,846,398 B2
(45) Date of Patent: Dec. 7, 2010

(54) MICRO REACTOR HAVING MICRO FLOW-GUIDING BLOCKS

(75) Inventors: Chi-Yuan Lee, Jhongli (TW); Shuo-Jen Lee, Yonghe (TW); Chin-Hua Wu, Jhongli (TW); Guan-Wei Wu, Su-ao Township, Yilan County (TW)

(73) Assignee: Yuan Ze University, Taoyuan County (TW)

( * ) Notice: Subject to any disclaimer, the term of this patent is extended or adjusted under 35 U.S.C. 154(b) by 739 days.

(21) Appl. No.: 11/896,501

(22) Filed: Sep. 4, 2007

(65) Prior Publication Data

US 2009/0311143 A1    Dec. 17, 2009

(30) Foreign Application Priority Data

Oct. 19, 2006    (TW) .............................. 95138634 A

(51) Int. Cl.
*B01J 19/00*    (2006.01)
(52) U.S. Cl. .................... 422/130; 422/193; 422/220
(58) Field of Classification Search ............ 422/129, 422/130, 188–191, 193, 195, 211, 220, 222, 422/228
See application file for complete search history.

(56) References Cited

U.S. PATENT DOCUMENTS 6,960,235 B2 * 11/2005 Morse et al. ............. 422/193

* cited by examiner

*Primary Examiner*—Walter D Griffin
*Assistant Examiner*—Timothy Cleveland
(74) *Attorney, Agent, or Firm*—Rosenberg, Klein & Lee

(57) ABSTRACT

A micro reactor having micro flow-guiding blocks includes a first gas flow channel, a second gas flow channel and a catalytic converter. There are several flow-guiding portions disposed on the first gas flow channel. Each flow-guiding portion has micro flow-guiding blocks, flow-impact recesses, and catalytic portions. The function of the micro flow-guiding block is to guide a flowing direction of the flow toward the catalytic portion on the flow-impact recess in order to increase a possibility of contacting and chemical reaction with the catalytic portion. So, guiding the flow direction toward the catalytic portion can increase the overall reaction efficiency. More turbulence is generated to obtain a better mixing. Plus, its structure is simple.

6 Claims, 5 Drawing Sheets

MICRO REACTOR HAVING MICRO FLOW-GUIDING BLOCKS

BACKGROUND OF THE INVENTION

1. Field of the Invention

The present invention relates to a micro reactor having micro flow-guiding blocks. In this invention, guiding the flow direction toward the catalytic portion can increase the overall reaction efficiency. More turbulence is generated to obtain a better mixing. Plus, its structure is simple.

2. Description of the Prior Art

Fuel cell is always a power generating method with low pollution and high efficiency. There are many different types of fuel cell. The primary fuels used in a typical fuel cell are hydrogen and oxygen. However, if the fuel cell is installed on a vehicle, how to store hydrogen and oxygen on this vehicle is a big issue to be discussed. The most common solution is to utilize the steam reforming of methanol (briefly referred as SRM) method to produce hydrogen. The related chemical reactions of the SRM method can be listed as follows:

$$CH_3OH + H_2O \leftrightarrow CO_2 + 3H_2 \quad (1)$$

$$CH_3OH \leftrightarrow 2H_2 + CO \quad (2)$$

$$CO + H_2O \leftrightarrow CO_2 + H_2 \quad (3)$$

In this SRM method, it is required to heat up a catalyst above a specific reaction temperature. Therefore, it is important to know how to design a reactor, especially including how to heat up, how to control the temperature inside, how to select a catalyst, how to make a best distribution for the catalysts, etc.

Furthermore, as illustrated in FIGS. 1, 2 and 3, the conventional reactor of steam reforming of methanol (SRM) includes:

a first gas flow channel 810 including a first inlet 812 and a first outlet 811;

a second gas flow channel 820 including a second inlet 821 and a second outlet 822; and a catalytic converter 830 including a plurality of micro channels 831 and at least one catalytic membrane 832 so as to connect the first gas flow channel 810 and the second gas flow channel 820.

Of course, a predetermined surface of the first gas flow channel 810 can be coated with a specific catalytic layer 90 (such as ZnO), as shown in FIGS. 2 and 3 (but not shown in FIG. 1) to enhance related chemical reactions.

Referring to FIG. 3, when a gas flows through the first gas flow channel 810, the possibility of contacting with the catalytic layer 90 (such as ZnO) is low. Accordingly, the entire reaction speed will be slow. Thus, the overall efficiency of the conventional reactor is poor.

Regarding the above-mentioned equation (3), if CO mixes with $H_2O$ very well, more hydrogen will be produced. Besides, because there is not any barrier or block inside the channel, the gas flows through the channel as a laminar flow state. There is no turbulence in the channel. Therefore, the mixing for gases is not good. It also causes the overall chemical reaction efficiency to be poor.

SUMMARY OF THE INVENTION

The primary object of the present invention is to provide a micro reactor having micro flow-guiding blocks. In which, by mean of guiding the flow direction toward the catalytic portion, it can increase the overall reaction efficiency.

The next object of the present invention is to provide a micro reactor having micro flow-guiding blocks. More turbulence is generated to obtain a better mixing.

Another object of the present invention is to a micro reactor having micro flow-guiding blocks. Its structure is simple.

DETAILED DESCRIPTION OF THE PREFERRED EMBODIMENT

Figure 1:
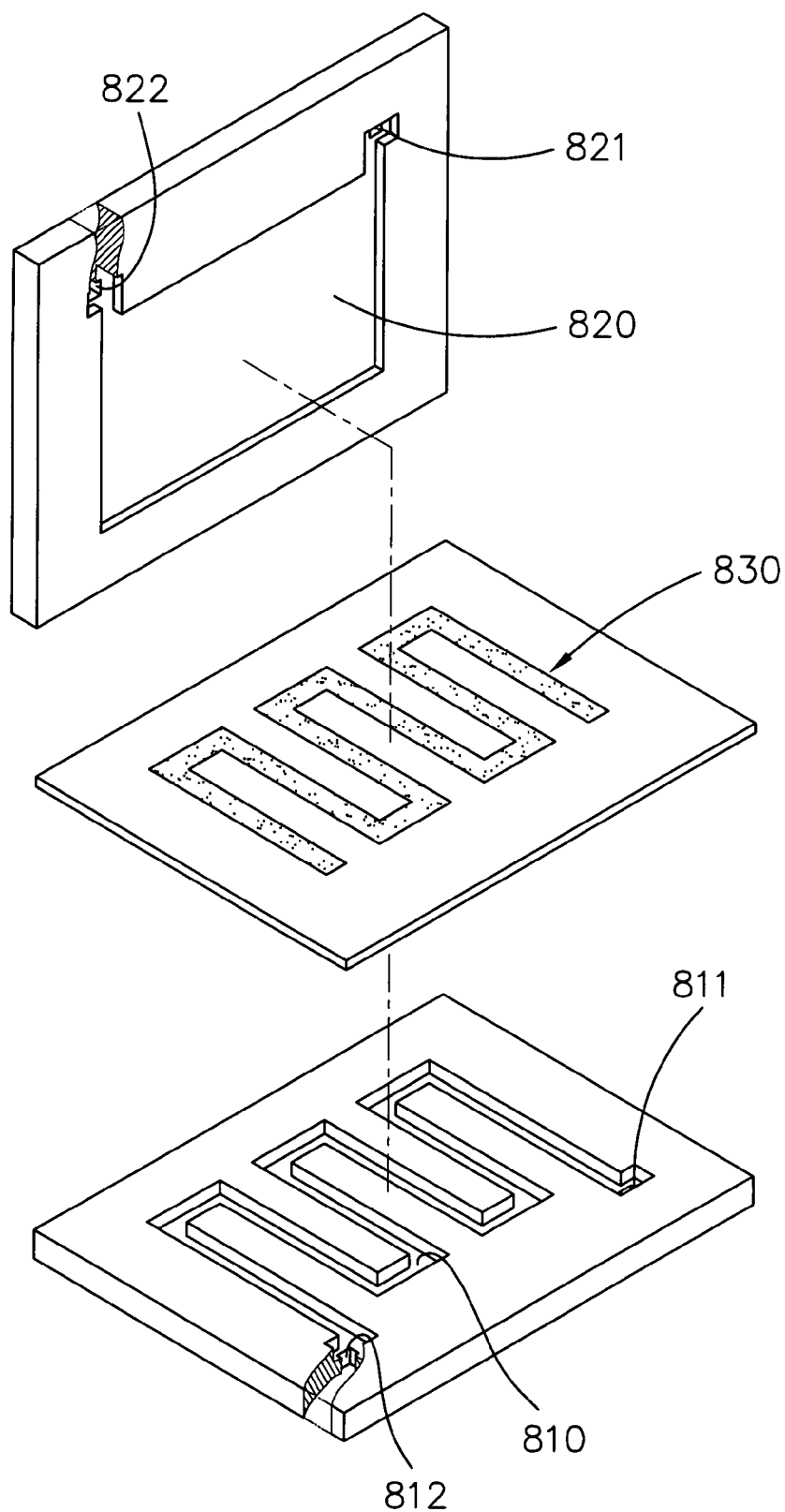
FIG. 1 is a perspective view of the conventional device.
Figure 2:
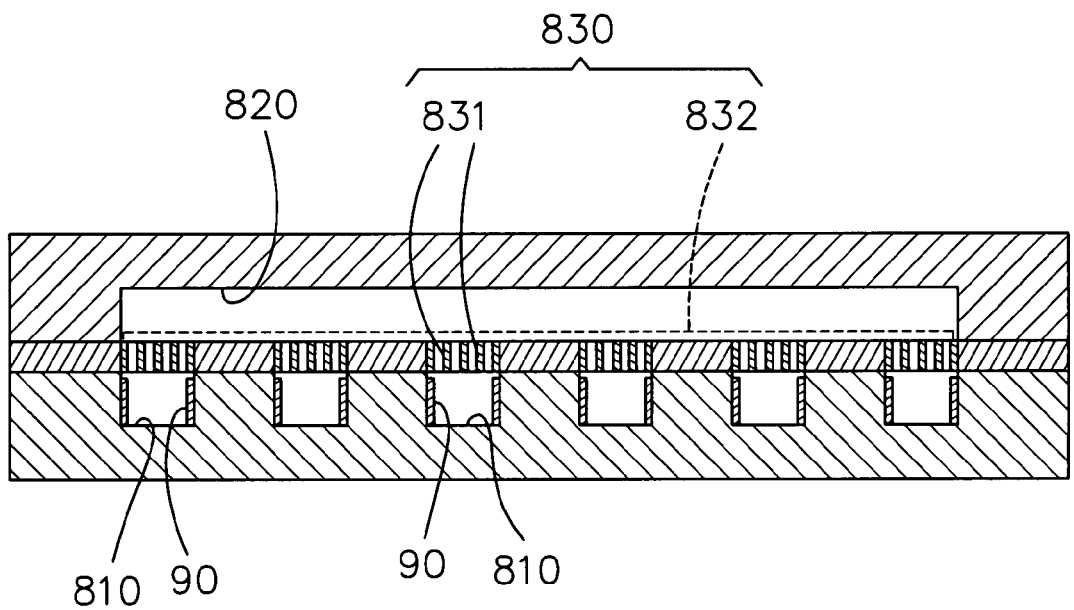
FIG. 2 is a cross-sectional view of the conventional device.
Figure 3:
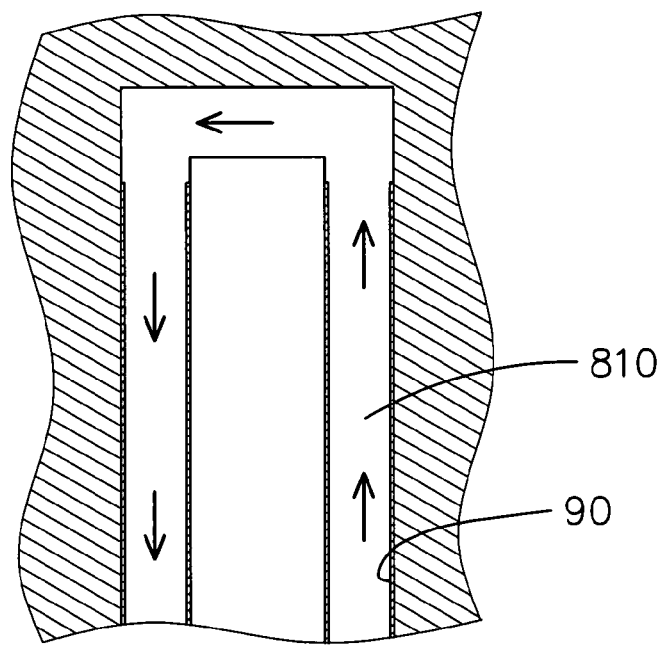
FIG. 3 is a view showing a selected portion of the conventional device.
Figure 4:
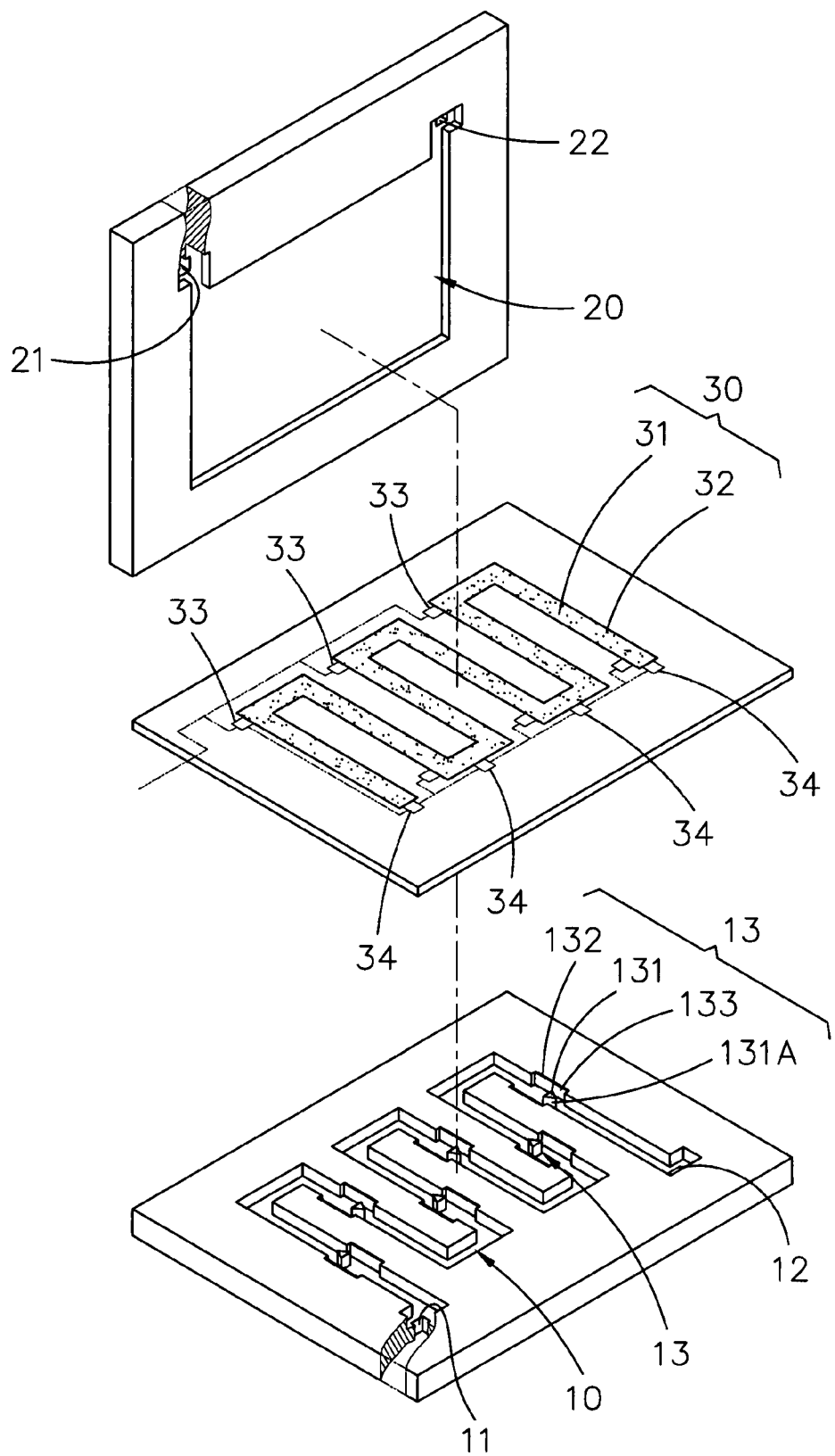
FIG. 4 is a perspective view of the present invention.
Figure 5:
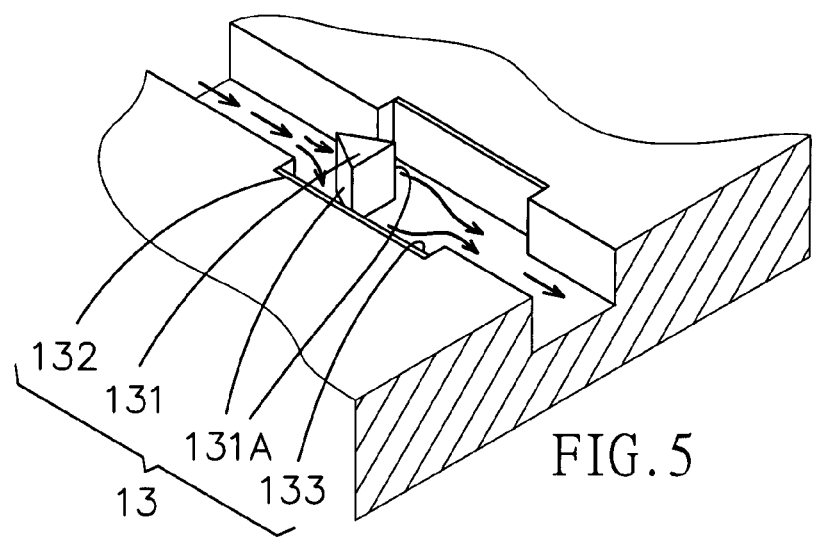
FIG. 5 is a view showing a selected portion of the present invention.
Figure 6:
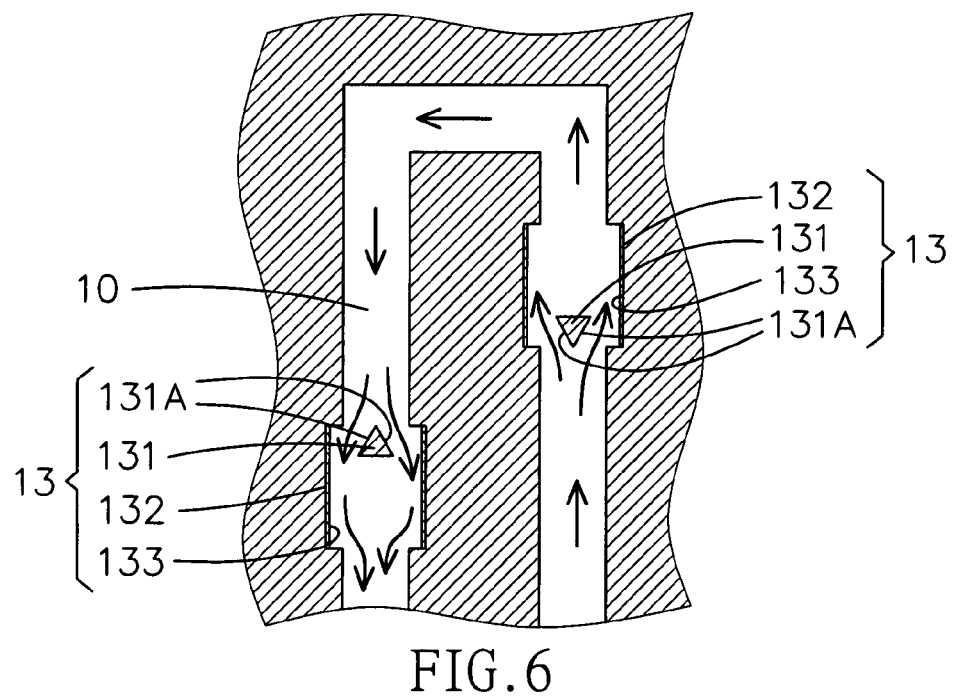
FIG. 6 illustrates one preferred embodiment of the present invention.

Referring to FIGS. 4, 5 and 6, the present invention is a micro reactor having micro flow-guiding blocks. It mainly comprises a first gas flow channel 10, a second gas flow channel 20, and a catalytic converter 30.

About this first gas flow channel 10, it includes a first inlet 11 and a first outlet 12. There are several flow-guiding portions 13 disposed on the first gas flow channel 10.

Concerning the second gas flow channel 20, it includes a second inlet 21 and a second outlet 22.

With regard to the catalytic converter 30, it includes a plurality of micro channels 31 and at least one catalytic membrane 32 so as to connect the first gas flow channel 10 and the second gas flow channel 20.

Moreover, each flow-guiding portion 13 has at least one micro flow-guiding block 131, at least one flow-impact recess 132, and at least one catalytic portion 133. The function of the micro flow-guiding block 131 is to guide a flowing direction of the flow toward the catalytic portion 133 on the flow-impact recess 132 so as to increase a possibility of contacting and chemical reaction on the catalytic portion 133.

Practically, as shown in FIGS. 5 and 6, each flow-impact recess 132 is substantially formed as rectangular recess. Each micro flow-guiding block 131 has two flow-guiding surfaces 131A so as to force the flow moving toward two flow-impact recesses nearby. This flow also will be separated apart and move toward the catalytic portions 133.

Figure 7:
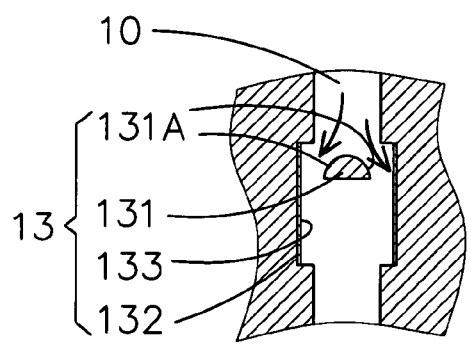
FIG. 7 shows other preferred embodiment of the present invention.
Figure 8:
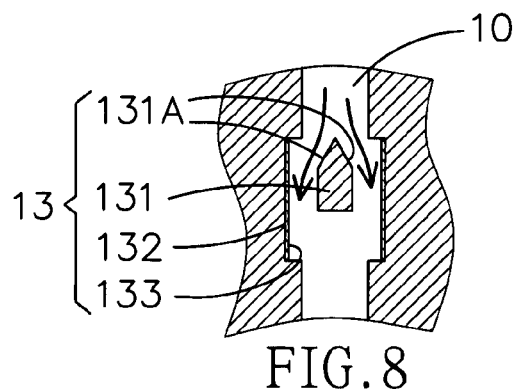
FIG. 8 shows another preferred embodiment of the present invention.

The shape of the micro flow-guiding block 131 can be selected from triangle (as shown in FIG. 6), semicircle (as illustrated in FIG. 7), trapezoid, ellipse, polygon (as shown in FIG. 8), etc.

The catalytic portions 133 can be selected from at least one of copper, ZnO, $Al_2O_3$, zinc, $TiO_2$.

As illustrated in FIG. 4, a plurality of sensors 33 and a plurality of heating elements 34 are disposed on the catalytic portion 30. The function of these sensors 33 is to detach the temperature and CO concentration in the first gas flow channel 10, the second gas flow channel 20 and the catalytic converter 30. Based on these detached information, it is possible to open or close the predetermined heating elements 34, so an optimum temperature and CO concentration can be remained in the first gas flow channel 10, the second gas flow channel 20 and the catalytic converter 30.

Moreover, the fuel cell is a low pollution and high efficient power generating method. Oxygen can be obtained from the atmosphere directly. Hydrogen can be obtained from the above-mentioned SRM method.

As shown in FIG. 5, there are several micro flow-guiding blocks 131 disposed on the first gas flow channel 10. Each micro flow-guiding block 131 has two (or more) flow-guiding surfaces 131A. Due to these two flow-guiding surfaces 131A, the flow is divided into two separated flows toward two flow-impact recesses 132 respectively. Thus, these separated flows hit on them and create more turbulence. Hence, the catalyst reaction possibility will be raised.

Meanwhile, because the micro flow-guiding block 131 blocks the flow, a laminar flow will turn into a turbulent flow. The mixing effect is better. Therefore, more chemical reaction will occur.

Figure 9:
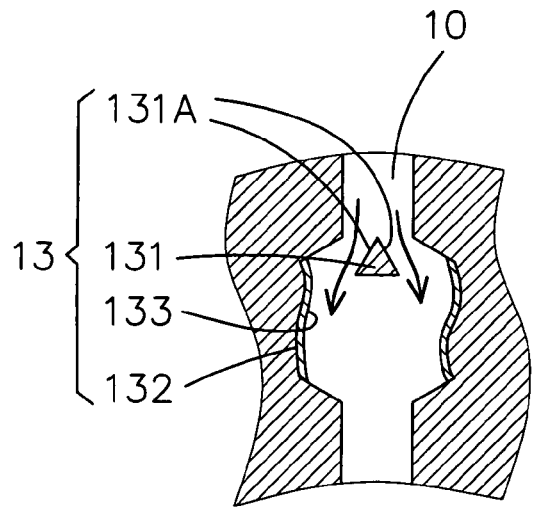
FIG. 9 is a view of type one of the flow-impact recess of the present invention.
Figure 10:
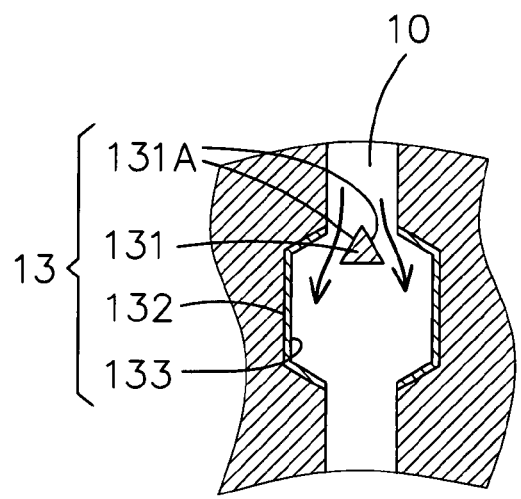
FIG. 10 is a view of type two of the flow-impact recess of the present invention.
Figure 11:
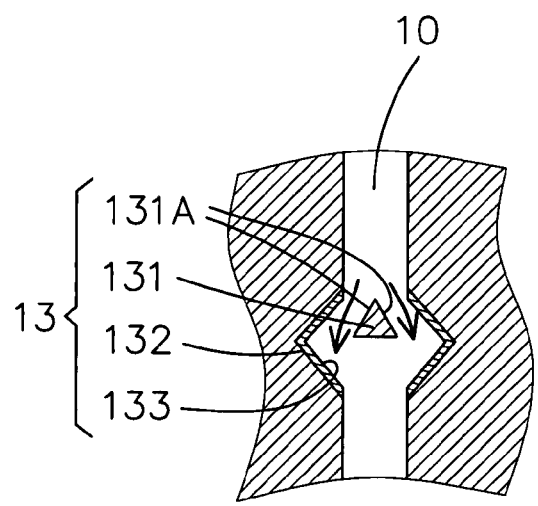
FIG. 11 is a view of type three of the flow-impact recess of the present invention.
Figure 12:
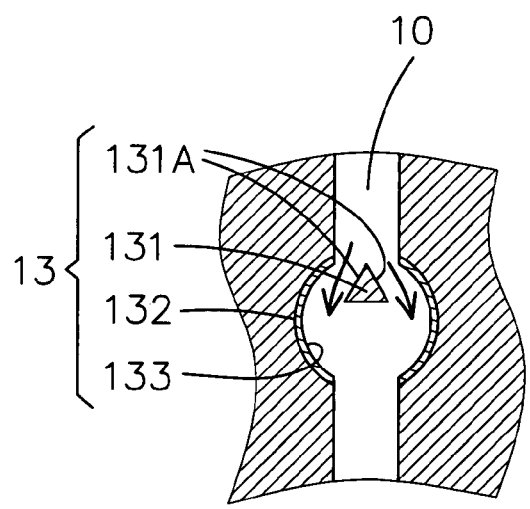
FIG. 12 is a view of type four of the flow-impact recess of the present invention.

In fact, the shape of the flow-impact recess 132 of the flow-guiding portion 13 can be selected from curved surfaces (as illustrated in FIG. 9), straight recessed surfaces (like "[ ]" shown in FIG. 10), symmetric corners (like "< >" as illustrated in FIG. 11), symmetrical curves (like "( )" shown in FIG. 12).

The advantages and functions of the present invention can be summarized as follows:

[1] Guiding the flow direction toward the catalytic portion can increase the overall reaction efficiency. In this invention, a plurality of micro flow-guiding blocks are properly disposed, so the flowing direction will be changed and then move toward the flow-impact recesses. Thus, the design can compel the flow to hit on the catalytic portion directly. Thus, it can increase the overall reaction efficiency.

[2] More turbulence is generated to obtain a better mixing. Once the flow is blocked by the micro flow-guiding blocks, the separated flows hit on the flow-impact recesses with more turbulence. As a result, a better mixing occurs. Therefore, the catalyst reaction efficiency becomes higher.

[3] It structure is simple. The micro flow-guiding blocks can be formed on predetermined locations. The manufacturing process for them is quite easy. Also, its structure is simple.

The above embodiments are only used to illustrate the present invention, not intended to limit the scope thereof. Many modifications of the above embodiments can be made without departing from the spirit of the present invention.

What is claimed is:

1. A micro reactor having micro flow-guiding blocks comprising:
  a first gas flow channel including a first inlet and a first outlet, a plurality of flow-guiding portions being fixed in said first gas flow channel;
  a second gas flow channel including a second inlet and a second outlet;
  a catalytic converter including a plurality of micro channels and at least one catalytic membrane so as to connect said first gas flow channel and said second gas flow channel;
  wherein each flow-guiding portion has at least one micro flow-guiding block, at least one flow-impact recess, and at least one catalytic portion; said micro flow-guiding block guiding a flowing direction of said flow toward said catalytic portion on said flow-impact recess so as to increase a possibility of contacting and reaction with said catalytic portion.

2. The micro reactor having micro flow-guiding blocks as claimed in claim 1, wherein each flow-impact recess is substantially formed as rectangular recess, each micro flow-guiding block has two flow-guiding surfaces so as to force a flow moving toward two flow-impact recesses nearby and said flow also be separated apart and moves toward the catalytic portions.

3. The micro reactor having micro flow-guiding blocks as claimed in claim 1, wherein a shape of said micro flow-guiding block is selected from triangle, semicircle, trapezoid, ellipse, and polygon.

4. The micro reactor having micro flow-guiding blocks as claimed in claim 1, wherein said catalytic portions are selected from at least one of copper, ZnO, $Al_2O_3$, zinc, $TiO_2$.

5. The micro reactor having micro flow-guiding blocks as claimed in claim 1, wherein a plurality of sensors and a plurality of heating elements are disposed on the catalytic portion.

6. The micro reactor having micro flow-guiding blocks as claimed in claim 1, wherein a shape of the flow-impact recess of the flow-guiding portion is selected from curved surfaces, straight recessed surfaces, symmetric corners, and symmetric curves.

* * * * *